US012802258B2

(12) United States Patent
Lore et al.

(10) Patent No.: US 12,802,258 B2
(45) Date of Patent: Nov. 17, 2026

(54) AUTOMATED BORESCOPE POSE ESTIMATION VIA VIRTUAL MODALITIES

(71) Applicant: RTX Corporation, Farmington, CT (US)

(72) Inventors: Kin Gwn Lore, Belmont, MA (US); Ganesh Sundaramoorthi, Duluth, GA (US); Ozgur Erdinc, Mansfield, CT (US)

(73) Assignee: RTX CORPORATION, Farmington, CT (US)

( * ) Notice: Subject to any disclaimer, the term of this patent is extended or adjusted under 35 U.S.C. 154(b) by 363 days.

(21) Appl. No.: 18/538,554

(22) Filed: Dec. 13, 2023

(65) Prior Publication Data

US 2025/0200781 A1 Jun. 19, 2025

(51) Int. Cl.

| | |
|---|---|
| ***G06T 7/70*** | (2017.01) |
| ***G06T 7/20*** | (2017.01) |
| ***G06T 7/50*** | (2017.01) |
| ***G06T 15/00*** | (2011.01) |

(52) U.S. Cl.

CPC .................. *G06T 7/70* (2017.01); *G06T 7/20* (2013.01); *G06T 7/50* (2017.01); *G06T 15/00* (2013.01)

(58) Field of Classification Search

CPC .... G06T 7/70; G06T 7/20; G06T 7/50; G06T 15/00; G06T 2207/10016; G06T 2207/10068; G06T 2207/20081; G06T 2207/20084; G06T 2207/30164; G06T 7/75

See application file for complete search history.

(56) References Cited

U.S. PATENT DOCUMENTS

| | | | | |
|---|---|---|---|---|
| 11,443,454 B2 | 9/2022 | Duong et al. | | |
| 2014/0176551 A1* | 6/2014 | Heisele | .................. | G06T 15/00 345/427 |
| 2021/0004984 A1* | 1/2021 | Ji | .............................. | G06T 7/11 |

FOREIGN PATENT DOCUMENTS

| | | |
|---|---|---|
| WO | 2020014170 A1 | 1/2020 |
| WO | 2020086217 A1 | 4/2020 |

OTHER PUBLICATIONS

Augmented autoencoders, Sundermeyer et al 2019 (Year: 2019).*
Borescope damage assessments, Wong 2021 (Year: 2021).*
Aust et al. "Automated defect detection and decision-support in gas turbine blade inspection" Aerospace 8.2 (Jan. 2021): 30 (27 pages).

(Continued)

*Primary Examiner* — Jianxun Yang
(74) *Attorney, Agent, or Firm* — CANTOR COLBURN LLP

(57) ABSTRACT

An object pose prediction system includes a training system and an imaging system. The training system is configured to repeatedly receive a plurality of training image sets and to train a machine learning model to learn a plurality of different poses associated with the test target object in response to repeatedly receiving the plurality of training image sets. The imaging system is configured to receive a 2D test image of a test object, process the 2D test image using the trained machine learning model to predict a pose of the test object, and output a 3D test image including a rendering of the 2D test image having the predicted pose.

19 Claims, 12 Drawing Sheets

(56) References Cited

OTHER PUBLICATIONS

Svensen et al. "Deep neural networks analysis of borescope images" Proceedings of the European Conference of the PHM Society. vol. 4. (Jul. 2018) 8 pages.
Uzun, İsmail "Damage detection in aircraft engine borescope inspection using deep learning" Republic of Turkey Aksaray University Graduate School of Natural and Applied Sciences (Jan. 2023) 82 pages.
Wong et al. "Automatic borescope damage assessments for gas turbine blades via deep learning" AIAA Scitech 2021 Forum. (Mar. 2021) 17 pages.
Search Report issued in European Patent Application No. 24206236.2; Date of Mailing Mar. 25, 2025 (11 pages).
Sundermeyer et al. "Implicit 3d orientation learning for 6d object detection from rgb images" International Conference, Oct. 6, 2018. pp. 712-729.

* cited by examiner

AUTOMATED BORESCOPE POSE ESTIMATION VIA VIRTUAL MODALITIES

STATEMENT OF FEDERAL SUPPORT

This invention was made with Government support under Contract FA8650-21-C-5254 awarded by the United States Air Force. The Government has certain rights in the invention.

BACKGROUND

As is known, a borescope is an optical instrument that is designed to assist in the visual inspection of inaccessible regions of objects. A borescope includes an image sensors coupled to flexible optical tube which allows a person at one end of the tube to view images acquired at the other end. Thus, borescopes typically include a rigid or flexible tube having a display on one end and a camera on the other end, where the display is linked to the camera to display images (i.e., pictures/videos) taken by the camera.

Borescopes may be used for many applications, such as the visual inspection of aircraft engines, industrial gas turbines, steam turbines, diesel turbines and automotive/truck engines. For example, when inspecting the internal structure of a jet engine for cracks or fatigue, small openings from the outside allow the borescope to be snaked into the engine without having to drop the engine from the plane. In such an inspection, it is often difficult for the inspector to know the exact borescope tip location and pose within the engine, making it difficult to identify the location of new defects (i.e., cracks) found or to return to previously identified trouble spots.

BRIEF DESCRIPTION

According to a non-limiting embodiment, an object pose prediction system includes a training system and an imaging system. The training system is configured to: repeatedly receive a plurality of training image sets and to train a machine learning model to learn a plurality of different poses associated with the test target object in response to repeatedly receiving the plurality of training image sets. Each training image set includes a two-dimensional (2D) training image including a target object having a captured pose, a positive three-dimensional (3D) training image representing the target object and having a rendered pose that is the same as the captured pose, and a negative 3D training image representing the 3D object and having a rendered pose that is different from the captured pose, wherein the test target object included in each training image set has a different captured pose. The imaging system is configured to receive a 2D test image of a test object, process the 2D test image using the trained machine learning model to predict a pose of the test object, and output a 3D test image including a rendering of the 2D test image having the predicted pose.

In addition to one or more of the features described above, or as an alternative to any of the foregoing embodiments, the 2D test image is generated by an image sensor that captures the test object in real-time, and the 3D test image is a computer-generated digital representation of the test object.

In addition to one or more of the features described above, or as an alternative to any of the foregoing embodiments, the 2D training image is generated by an image sensor that captures the test object, and both of the positive 3D training image and the negative 3D training image are computer-generated digital representations of the training object.

In addition to one or more of the features described above, or as an alternative to any of the foregoing embodiments, the training system trains the machine learning model using the 2D training image, the positive 3D training image, and the negative 3D training image defines a domain gap having a first error value associated with the machine learning model.

In addition to one or more of the features described above, or as an alternative to any of the foregoing embodiments, the training system performs optical flow processing on the 2D training image and the positive 3D training image included in each training image set to adjust the domain gap from the first error value to a second error value less than the first error value.

In addition to one or more of the features described above, or as an alternative to any of the foregoing embodiments, the training system performs a Fourier domain adaptation (FDA) operation on the 2D training image and the positive 3D training image included in each training image set to adjust the domain gap from the first value to a second value less than the first value.

In addition to one or more of the features described above, or as an alternative to any of the foregoing embodiments, the imaging system includes a borescope configured to capture the 2D test image of the test object.

According to another non-limiting embodiment, an object pose prediction system includes an image sensor and a processing system. The image sensor is configured to generate at least one 2D test image of a test object existing in real space and having a pose and depth. The processing system is configured to generate an intermediate digital representation of the test object having a predicted pose and predicted depth based on the 2D test image, and to generate a 3D digital image of the test object having the predicted pose and the predicted depth.

In addition to one or more of the features described above, or as an alternative to any of the foregoing embodiments, wherein the at least one 2D test image includes a video stream containing movement of the test object, and wherein the processing system performs optical flow processing on the video stream to determine the predicted pose and the predicted depth.

In addition to one or more of the features described above, or as an alternative to any of the foregoing embodiments, the object pose prediction system includes a training system configured to repeatedly receive a plurality of training images of a training object having known depths corresponding to respective poses, to generate a depth map that maps the depth of the training object with the respective pose, and to train a machine learning model using the depth map.

In addition to one or more of the features described above, or as an alternative to any of the foregoing embodiments, the image processing system generates the intermediate digital representation of the test object having a predicted pose based on the pose captured in the 2D test image and a predicted depth based on the trained machine learning model.

In addition to one or more of the features described above, or as an alternative to any of the foregoing embodiments, the image processing system generates the 3D digital image of the test object having the predicted pose and the predicted depth based on the intermediate digital representation of the test object.

In addition to one or more of the features described above, or as an alternative to any of the foregoing embodiments, the object pose prediction system further includes a training system configured to: repeatedly receive a plurality of training image sets, each training image set comprising a two-dimensional (2D) training image including a target object having a captured pose, a positive three-dimensional (3D) training image representing the target object and having a rendered pose that is the same as the captured pose, and a negative 3D training image representing the 3D object and having a rendered pose that is different from the captured pose, wherein the test target object included in each training image set has a different captured pose; and to train a machine learning model to learn a plurality of different poses associated with the test target object in response to repeatedly receiving the plurality of training image set.

In addition to one or more of the features described above, or as an alternative to any of the foregoing embodiments, the imaging system compares the intermediate digital representation of the test object having the predicted pose and the predicted depth to the positive 3D training images having rendered poses and rendered depths, determines a matching positive 3D training image having a rendered pose and rendered depth that mostly closely resembles the predicted pose and the predicted depth, and generates the 3D digital image of the test object having the predicted pose and the predicted depth based on the matching positive 3D training image.

In addition to one or more of the features described above, or as an alternative to any of the foregoing embodiments, the image sensor is a borescope.

According to yet another non-limiting embodiment, a method of predicting depth of a two-dimensional (2D) image is provided. The method comprises repeatedly inputting a plurality of training image sets to a computer processor. Each training image set comprising a two-dimensional (2D) training image including a target object having a captured pose, a positive three-dimensional (3D) training image representing the target object and having a rendered pose that is the same as the captured pose, and a negative 3D training image representing the 3D object and having a rendered pose that is different from the captured pose, wherein the test target object included in each training image set has a different captured pose. The method further comprises training a machine learning model included in the computer processor to learn a plurality of different poses associated with the test target object in response to repeatedly receiving the plurality of training image sets. The method further comprises inputting a 2D test image of a test object to the computer processor; processing the 2D test image using the trained machine learning model to predict a pose of the test object; and outputting a 3D test image including a rendering of the 2D test image having the predicted pose.

In addition to one or more of the features described above, or as an alternative to any of the foregoing embodiments, the method further comprises generating the 2D test image using an image capture the test object in real-time; and generating the 3D test images as digital representation of the test object.

In addition to one or more of the features described above, or as an alternative to any of the foregoing embodiments, the method further comprises generating the 2D training image using an image sensor that captures the test object; and generating both of the positive 3D training image and the negative 3D training as computer-generated digital representations of the training object.

In addition to one or more of the features described above, or as an alternative to any of the foregoing embodiments, the method further comprises training the machine learning model using the 2D training image, the positive 3D training image, and the negative 3D training image to define a domain gap having a first error value associated with the machine learning model.

In addition to one or more of the features described above, or as an alternative to any of the foregoing embodiments, the method further comprises performing an optical flow processing on the 2D training image and the positive 3D training image included in each training image set to adjust the domain gap from the first error value to a second error value less than the first error value.

In addition to one or more of the features described above, or as an alternative to any of the foregoing embodiments, the method further comprises performing a Fourier domain adaptation (FDA) operation on the 2D training image and the positive 3D training image included in each training image set to adjust the domain gap from the first value to a second value less than the first value.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of illustration and not limitation with reference to the Figures.

Various approaches have been developed for estimating the pose of an object captured by a borescope so that accurate engine defect detections can be performed. One approach includes performing several sequencies of mapping a defect onto a computer-generated image or digital representation of the object of such as, for example, a CAD model of the object having the defect.

Figure 1:
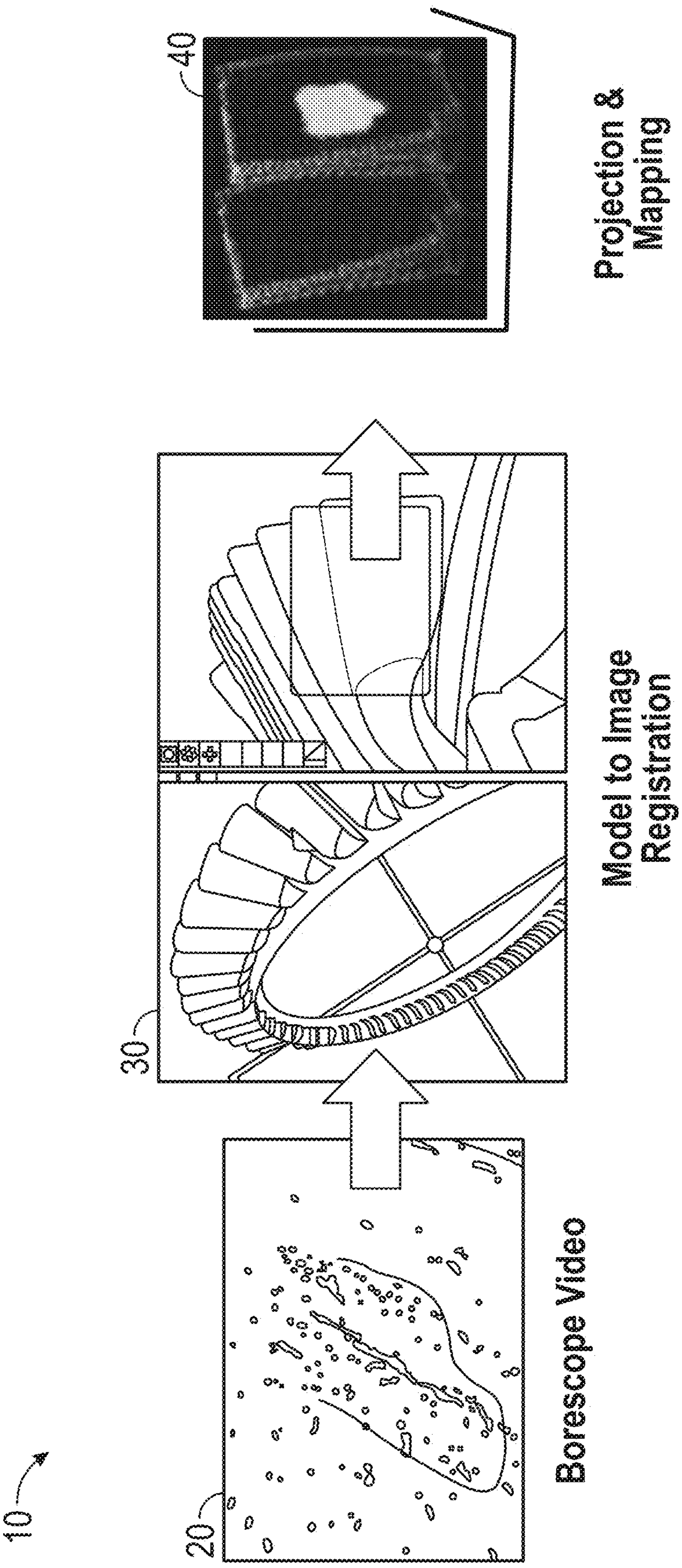
FIG. 1 is a visual representing illustrating a method for mapping a defect of an object onto a computer-aided design (CAD) model using a 2D borescope inspection video.

Turning to FIG. 1, for example, a method 10 of mapping a defect of an object onto a CAD model is illustrated. The method 10 includes using a borescope to obtain a borescope video of an object and performing visual analytics 20 to detect defects in the object. The images of the borescope video are aligned with the CAD model 30 based on the observed (i.e., inferred) object pose and the projected detected defects from the images are mapped to the CAD model 40, which is then digitized. Unfortunately however, digitizing identified defects is a challenge due to the need for pose estimation to map the detected defects onto a CAD model. While pose estimation may be performed for RGB/monochrome images and depth modality, the obtained image datasets typically lack sufficient depth sensor data to provide depth information to ease alignment. Understanding pose and position of a moving camera in scene, or pose of an object part, is important for situational awareness and other 3D-space analysis. CAD model needs to be registered to the image/video frame, so that any visual detections can be projected onto the CAD model for digitization. And for an egocentric camera (i.e., a borescope), it is challenging to register the CAD model to the observed scene due to the permanent occlusion and the small field of view.

Existing pose estimation frameworks need large amounts of labeled training data (e.g. key points on images for supervised training via deep learning). As such, unsupervised pose estimation is desired, but current methods are limited to certain extents (e.g. fitting silhouette of CAD/assembly model over the segmented images). Moreover, current methods are not always feasible due to clutter, environmental variations, illumination, transient objects, noise, etc., and a very small field-of-view (the entire part is typically not visible for any global pose estimation). Additionally, sparse/repetitive features may cause additional challenges for local pose estimation. These issues are exacerbated for smart factory application and other specialized applications because part geometries are typically specialized and nonstandard. This makes training off-the-shelf pose estimation and image registration framework difficult due to non-transferrable weight (i.e., domain shift) and lack of labeled training datasets.

Non-limiting embodiments of the present disclosure address the above problem using automated pose estimation via virtual modalities. A first embodiment is referred to a "direct pose regression method" and involves directly predicting a pose (e.g., borescope and/or blade) using red, green, blue (RGB) imageries or monochrome imageries, referred to herein as two-dimensional (2D) real images. The direct pose regression method includes training a neural network using common representations of an object or part targeted for defect detection to distinguish between 2D real images (e.g., video images from a borescope) and three-dimensional (3D) computer-aided design (CAD) model images referred to as 3D synthetic images. The accuracy of the prediction can be further improved by applying a Fourier domain adaption to the model and/or input additional derived common representations of the target object to further train the neural network.

A second embodiment is referred to as "virtual modality matching" and involves predicting an intermediate representation of a target object from a video image, and using the intermediate representation of the target object as a virtual modality for aligning a CAD model of the target object in 3D space. Predicting the intermediate representation of the target object includes determining the depth of the target object and using the determined depth to determine a 3D shape of the CAD model with an accurately predicted pose. The depth can be determined using, for example, a performing optical flow analysis of input real 2D images, transfer learning, and/or synthetic render matching.

Figure 2:
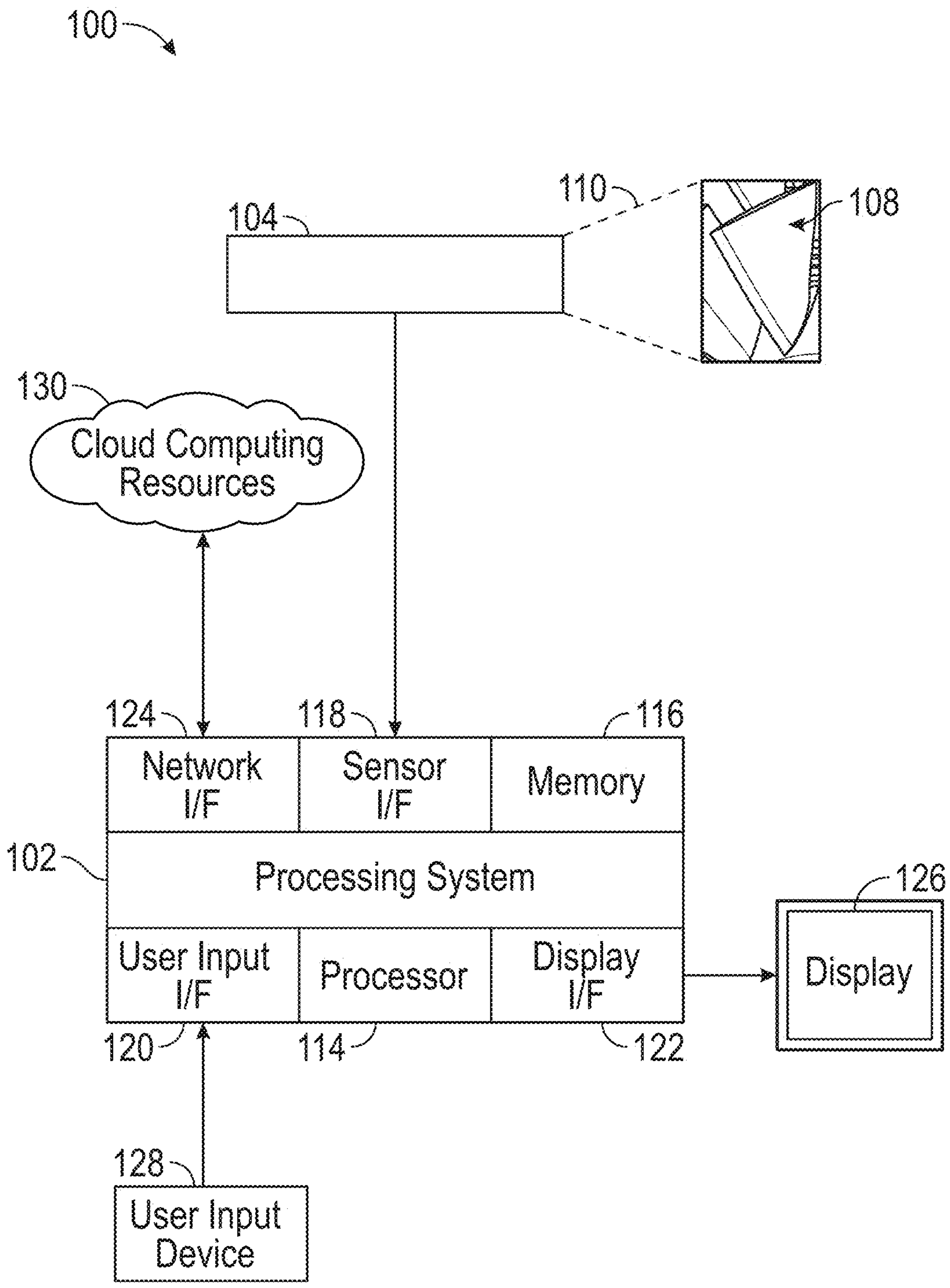
FIG. 2 illustrates an imaging system configured to perform automated pose estimation via virtual modalities is illustrated according to non-limiting embodiment of the present disclosure.

Referring now to FIG. 2, an imaging system 100 is illustrated which includes a processing system 102 and an image sensor 104. The image sensor 104 can include a borescope 104, for example, which can analyze one or more test objects 108 appearing within a FOV 110. The test object 108 described herein is an aircraft turbine blade, for example, but it should appreciated that the image sensor 104 described herein can analyze other types of test objects 108 without departing from the scope of the invention.

The processing system 102 includes at least one processor 114, memory 116, and a sensor interface 118. The processing system 102 can also include a user input interface 120, a display interface 122, a network interface 124, and other features known in the art. The image sensors 104 are in signal communication with the sensor interface 118 via wired and/or wireless communication. In this manner, pixel data output from the image sensor 104 can be delivered to the processing system 102 for processing.

The processor 114 can be any type of central processing unit (CPU), or graphics processing unit (GPU) including a microprocessor, a digital signal processor (DSP), a microcontroller, an application specific integrated circuit (ASIC), a field programmable gate array (FPGA), or the like. Also, in embodiments, the memory 116 may include random access memory (RAM), read only memory (ROM), or other electronic, optical, magnetic, or any other computer readable medium onto which is stored data and algorithms as executable instructions in a non-transitory form.

The processor 114 and/or display interface 122 can include one or more graphics processing units (GPUs) which may support vector processing using a single instruction multiple data path (SIMD) architecture to process multiple layers of data substantially in parallel for output on display 126. The user input interface 120 can acquire user input from one or more user input devices 128, such as keys, buttons, scroll wheels, touchpad, mouse input, and the like. In some embodiments the user input device 128 is integrated with the display 126, such as a touch screen. The network interface 124 can provide wireless and/or wired communication with one or more remote processing and/or data resources, such as cloud computing resources 130. The cloud computing resources 130 can perform portions of the processing described herein and may support model training.

In one or more non-limiting embodiments, the processing system 102 is capable of generating digital representations of an object or computer-aided design (CAD) images. The CAD images may serve as "synthetic" three-dimensional (3D) images that represent two-dimensional (2D) images obtained from the image sensor 104 (e.g., 2D RGB video images provided by a borescope 104). The CAD images can be stored in the memory 116 and used to perform unsupervised training to facilitate contrastive Learning of common representations between the real 2D RGB images and the synthetic 3D CAD images.

Figure 3:
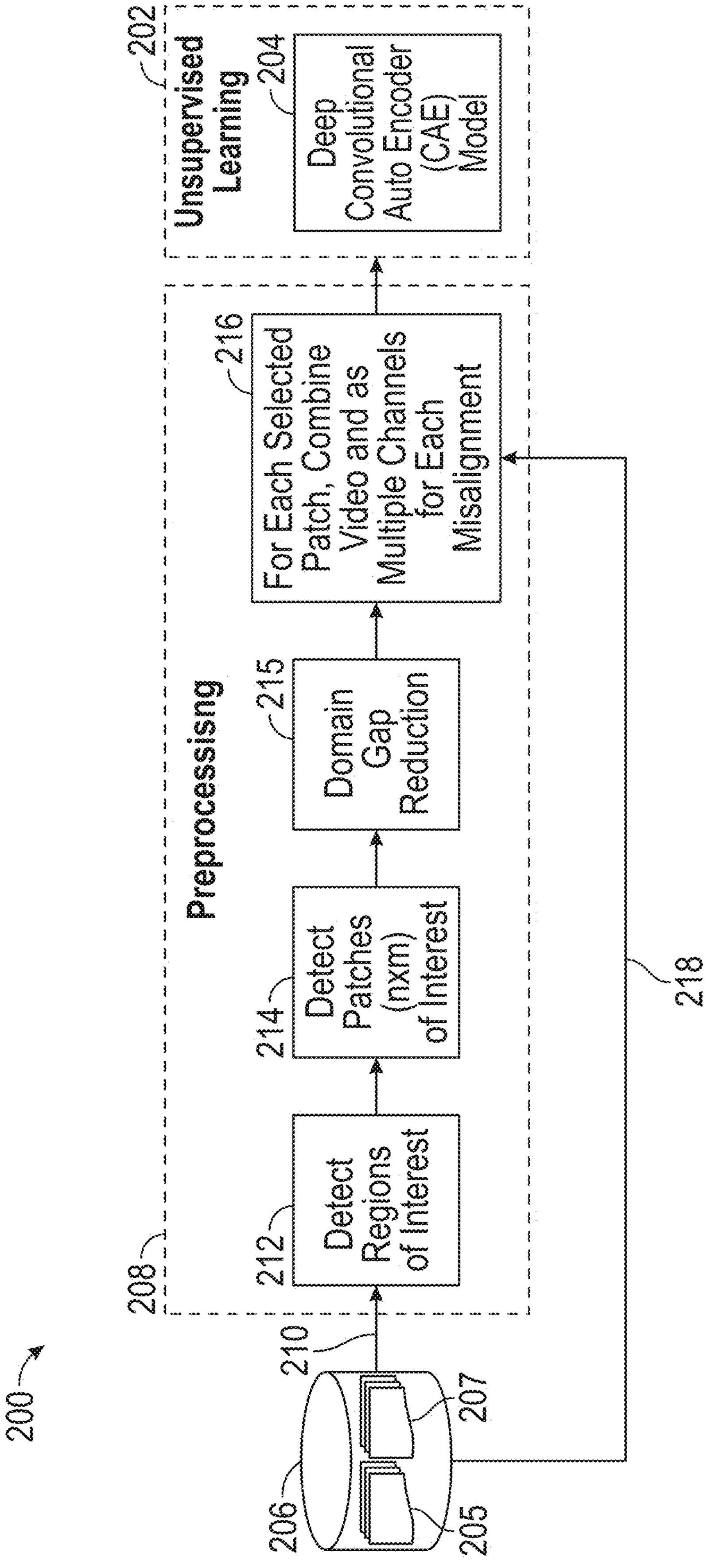
FIG. 3 depicts an unsupervised training system to train an artificial intelligence machine learning (AIML) algorithm/model capable of performing automated pose estimation via virtual modalities is illustrated according to non-limiting embodiment of the present disclosure.

Turning to FIG. 3, a training system 200 configured to train an artificial intelligence machine learning (AIML) algorithm/model capable of performing automated pose estimation via virtual modalities is illustrated according to non-limiting embodiment of the present disclosure. The training system 200 can be established as an unsupervised learning training system 200, which can analyze and process unlabeled data so as to avoid the need to constant manual image annotation in order to train the AIML model 204.

In the example of FIG. 3, a data source 206 provides training data to develop the AIML model 204 after preprocessing 208 is performed. The training data in data source 206 can originate from data captured by an image sensor, (e.g., image sensor 104 shown in FIG. 2) for example, during a training phase. The training data 205 can include real image data 205 and synthetic image data 207. The real image data 205 can include, for example, RGB video images of objects (e.g., turbine blade 108) captured by an image sensor (e.g., a borescope 104). The synthetic image data 207 can include computer-aided design (CAD) images that represent the real image data 205. For example, a borescope may generate a real RGB image 205 of a turbine blade having a captured shape, pose and depth (i.e., in the field). A CAD system can then generate synthetic CAD images 207 of the turbine blade included in the real image 205. The synthetic CAD images 207 are generated with the intention of representing all possible poses and depths of the turbine blade included in the real image 205.

The training system 200 can be performed as part of an off-line process using a separate processing system. Alternatively, the processing system 102 can be configured in a training phase to implement the training system 200 of FIG. 3.

Given multi-modal sensor data with no prior knowledge of the system, it is possible to register the data streams. For illustration, training system 200 is described with respect to an image-video registration example. By creating an over-constrained deep auto-encoder (DAE) definition, the DAE can be driven to capture mutual information in both the image and/or video data by reducing the randomness of a DAE bottleneck layer (i.e., a reduction layer) well beyond the rank at which optimal reconstruction occurs. Minimizing the reconstruction error with respect to relative shifts of the image and/or video data reflects that the current alignment of the sensor data has the greatest correlation possible (i.e., smallest misalignment). This method can be applied for both spatial and temporal registration.

The training system can implement a variety of DAEs including, but not limited to, a deep convolutional auto-encoder (CAE) and a deep neural network auto-encoder (DNN-AE). A DNN-AE, for example, takes an input x∈Rd and first maps it to the latent representation h∈Rd' using a deterministic function of the type h=fθ=σ(Wx+b) with θ={W, b} where W is the weight and b is the bias. This "code" is then used to reconstruct the input by a reverse mapping of y=fθ'(h)=σ(W'h+b') with θ'={W',b'}. The two parameter sets are usually constrained to be of the form W'=WT, using the same weights for encoding the input and decoding the latent representation. Each training pattern (xi) is then mapped onto its code hi and its reconstruction (yi). The parameters are optimized, minimizing an appropriate cost function over the training set Dn={(x0, t0), . . . , (xn, tn)}.

The first step includes using a probabilistic Restricted Boltzmann Machine (RBM) approach, trying to reconstruct noisy inputs. The training system 200 can involve the reconstruction of a clean sensor input from a partially destroyed/missing sensor. The sensor input (x) becomes corrupted sensor input (x) by adding a variable amount (v) of noise distributed according to the characteristics of the input data. An RBM network is trained initially with the same number of layers as envisioned in the final DNN-AE in model 204. The parameter (v) represents the percentage of permissible corruption in the network. The model 204 is trained to de-noise the inputs by first finding the latent representation h=fθ(x)=σ(Wx+b) from which to reconstruct the original input y=fθ'(h)=σ(W'h+b').

As part of preprocessing 208, the training system 200 can include a region-of-interest detector 212, a patch detector 214, a domain gap reduction unit 215, and a data fuser 216. Frame data 210 from training data 205 can be provided to the region-of-interest detector 212, which may perform edge detection or other types of region detection known in the art. The patch detector 214 can detect patches (i.e., areas) of interest based on the regions of interest identified by the region-of-interest detector 212 as part of preprocessing 208. The domain gap reduction unit 215 performs various processes that reduces the domain gap between the real images provided by the image sensor 104 (e.g., real RGB video images) and the synthetic images (e.g., the synthesized CAD images generated to represent the RGB video images.) As described herein, a low domain gap indicates that the data distribution in the target domain is relatively similar to that of the source domain. When there is a low domain gap, the AIML model is more likely to generalize effectively to the target domain. The Data fuser 216 merges image data 218 from the training data 205 with image and/or video data 210 from selected patches of interest as detected by the patch detector 214 as part of preprocessing 208. The frame data 210 and image data 218 fused as multiple channels for each misalignment are provided for unsupervised learning 202 of model 204.

According to one or more non-limiting embodiments, the training system 200 can implement one or more autoencoders (e.g., encoders/decoders) trained according to semi-supervised learning, which involves using only a few known real 2D images and synthetic 3D CAD images that are annotated/labeled, and then a majority of other unlabeled real 2D images and synthetic 3D CAD images. The semi-supervised learning can then a machine learning (ML) model that can be trained according to the following operations: (1) if a label exists, directly optimize the ML model by the supervised loss; and (2) if label does not exist, optimize the ML model by reconstruction error.

Figure 4:
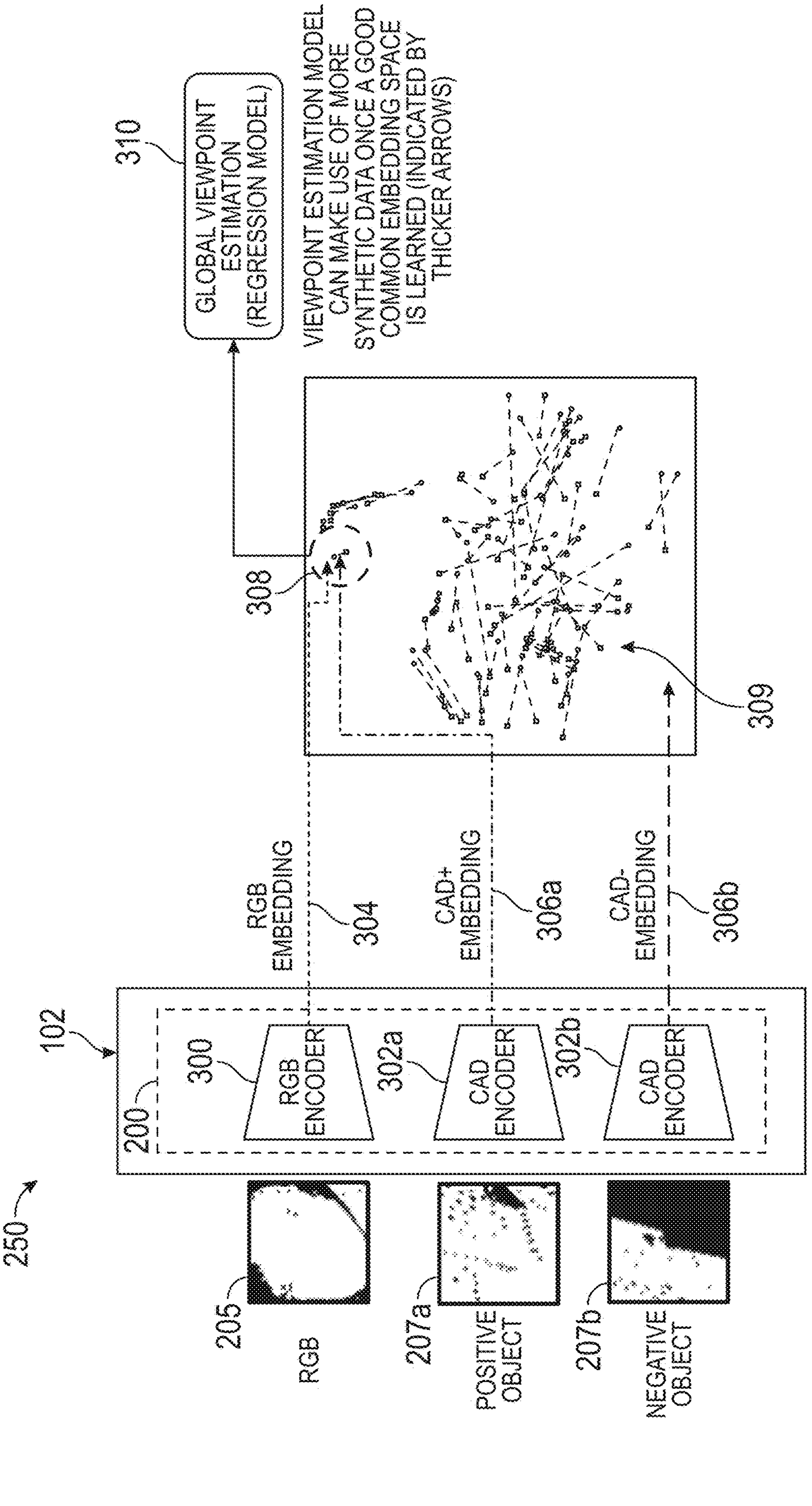
FIGS. 4 and 5 depict an object pose prediction system capable of performing a direct pose regression method to directly predicting a pose of an object using 2D RGB imageries according to a non-limiting embodiment of the present disclosure.
Figure 5:
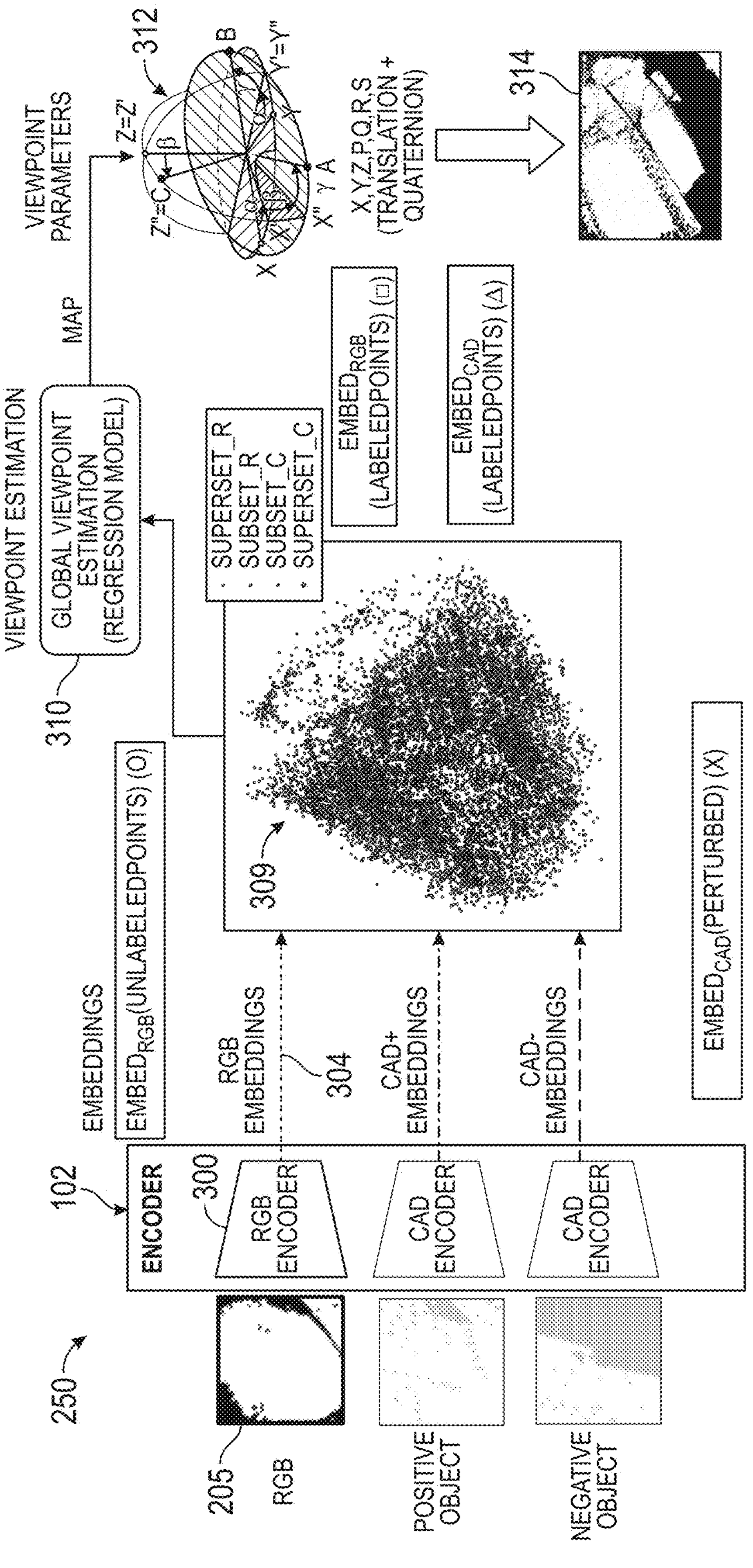

With reference now to FIGS. 4 and 5 an object pose prediction system 250 capable of performing a direct pose regression method to directly predicting a pose of an image sensor and/or target object using 2D RGB imageries is illustrated according to a non-limiting embodiment of the present disclosure. Turning to FIG. 4, a training operation included in the direct pose regression method is illustrated according to a non-limiting embodiment. The training operation utilizes a multitude of training image sets 201 to train a machine learning model or computer vision model such as, for example, a viewpoint estimation model 310 (sometimes referred to as a "pose estimation model" or a "camera pose estimation model") over several iterations of a training operation 200. Each image set 201 includes real 2D image 205, a positive synthetic 3D image 207*a*, and a negative synthetic image 207*b*. The real 2D images 205 include 2D RGB images appearing in a video captured by a borescope 104. Each real 2D image 205 includes a training object that has a given shape, pose and depth, e.g., that is captured by the borescope 104. The positive synthetic 3D images 207*a*, and negative synthetic images 207*b* are rendered 3D CAD images generated by a CAD processing system (e.g., system 102). Each positive synthetic 3D image 207*a* includes a rendering of the training object having a shape, pose and depth intended to closely match the shape, pose and depth of the real 2D image. In some scenarios, a positive synthetic 3D image 207*a* has the same pose, or substantially the same pose, as the real 2D image, i.e., a "positive pose." Each negative synthetic images 207*b* is also a rendering of the training object, but has a shape, pose and depth that is known to be different from real 2D image. In other words, the rendered training object appearing in the negative synthetic image 207*b* has a different pose compared to the training object appearing in the real 2D image, and is therefore referred to as having a "negative pose."

The real 2D images 205 are input to a real image encoder 300, which transforms the real 2D images 205 into latent space data 304 to produce a real image point cloud 309 including a set of data representing the different input real 2D images. The point cloud 309 can be defined as a distribution of data in the feature/embedding space. Each input image 205, 207*a* and 207*b* maps to a single point in the point cloud 309 (e.g., see FIG. 4). Thus, many images 205, 207*a* and 207*b* will map to multiple corresponding points, thus forming a point cloud 309. The positive synthetic images 207*a* are input to a positive synthetic image encoder 302*a*, which transforms the positive synthetic images 207 into latent space data 306*a* to produce a positive synthetic image point cloud including a set of data representing the different 3D synthetic CAD images. The negative synthetic images 207*b* are input to a negative synthetic image encoder 302*b*, which transforms the negative synthetic images 270*b* into late space data 306*b* to produce a negative image point cloud including a set of data representing the different input negative 3D CAD images. The real image encoder 300 and the positive synthetic image encoder 302*a* operate to force the data points in the positive synthetic image point cloud as close as possible toward the data points in the real image point cloud, whereas the real image encoder 300 and the negative synthetic image encoder 302*b* operate together to force the data points in the real image point cloud as far as possible away from data points in the negative synthetic image point cloud. In one or more non-limiting embodiments, negative synthetic images 207*b* can be used to introduce perturbations filling in voids or missing data points in the point cloud 309.

After a given number of iterations, the system 200 learns a common embedding space 308 in which the data points of the positive synthetic image point cloud match or substantially match the data points of the real image point cloud. Accordingly, the common embedding space 308 can be utilized to define a viewpoint estimation model 310 (e.g. regression model) that can make use of additional unlabeled synthetic data (e.g., positive synthetic images 207*a* and negative synthetic images 207*b*) to further refine and train the viewpoint estimation model 310. According to one or more non-limiting embodiments, the viewpoint estimation model 310 can be continuously trained until a domain gap of the common embedding space 310 is below a domain gap threshold.

Turning to FIG. 5, the object pose prediction system 250 is illustrated following the training operation described above. Once trained, a real 2D image 205 of an object obtained from a borescope, for example, can be input to the RGB encoder 300 and transformed into latent space data 304. The viewpoint estimation model 310 maps the latent space data 304 into viewpoint parameters 312 defining the predicted pose (x, y, z, p, q, r, s) of the object in the 2D real image. The viewpoint parameters 312 can include, for example, x, y, z, p, q, r, s, where the position of the synthesized 3D object in three-dimensional space is defined by coordinates x, y, z, and the rotation of the synthesized 3D object is defined by coordinates p, q, r, s. Thus, (x, y, z) defines "translation" in the 3D Cartesian coordinate space, and (p, q, r, s) is a quaternion representation defining "rotation." The corresponding synthetic 3D image 314 having the predicted pose can then be obtained (e.g., from memory 116) and displayed (e.g., on display 126).

Figure 6:
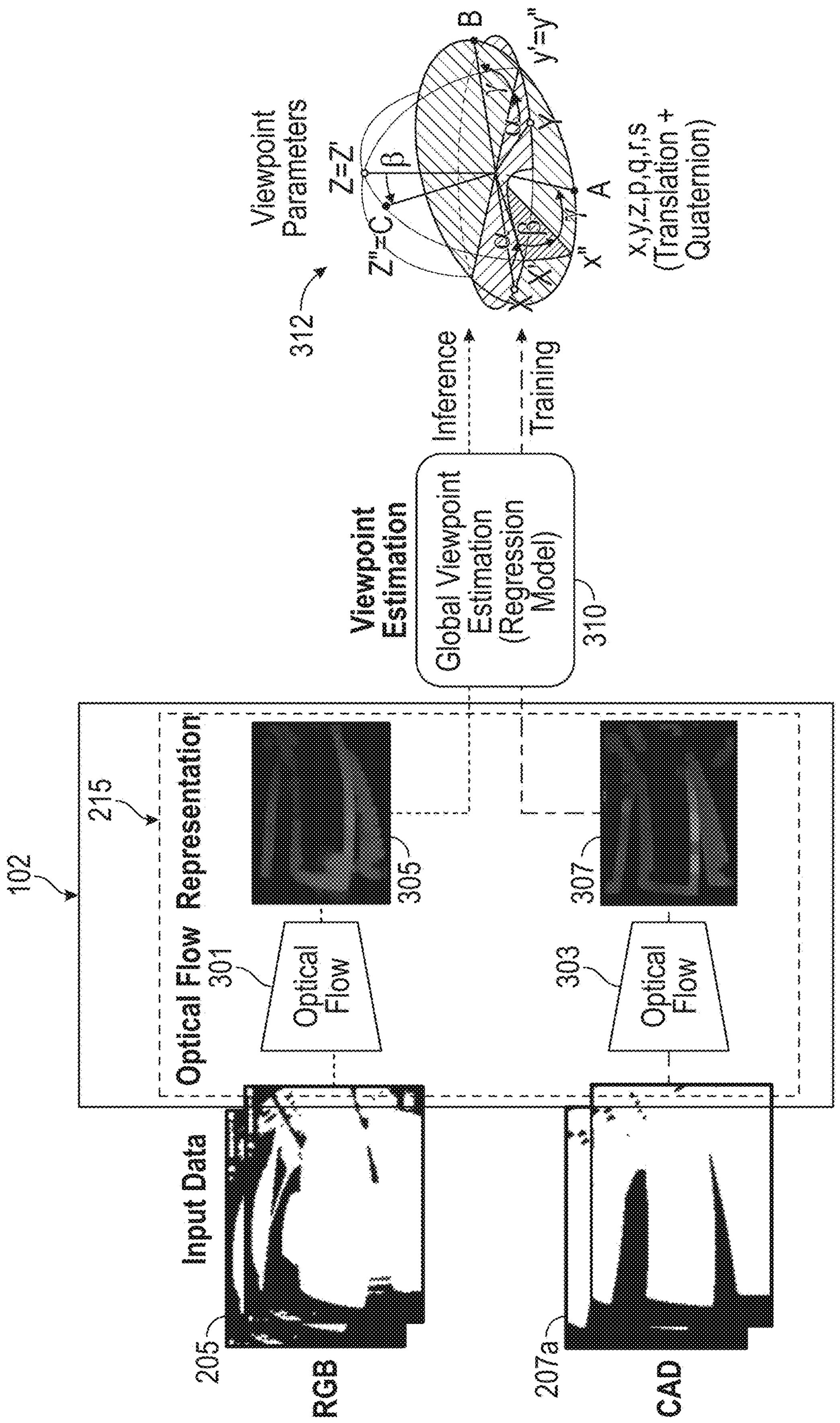
FIG. 6 depicts a domain gap reduction operation according to a non-limiting embodiment of the present disclosure.

The training system 200 described herein can also improve and refine the accuracy of the viewpoint estimation model 310 by performing one or more additional processing operations during the training phase that reduce the domain gap (e.g., "error") between the real 2D images 205 and the positive synthetic 3D images 207*a*. Turning to FIG. 6, for example, the training system 200 can employ a domain gap reduction unit 215, which includes a 2D real image optical flow encoder 301 and a 3D synthetic image optical flow encoder 303. The 2D real image optical flow encoder 301 receives a moving sequence of 2D real images 205 (e.g., a video) captured by a borescope, for example, and performs optical flow processing to generate a representation 305 of the 2D target object. The 3D synthetic image optical flow encoder 303 receives a moving sequence of 3D synthetic images 207*a* (e.g., CAD images 207*a*) rendered and streamed to mimic the moving sequence of 2D real images 205 and performs optical flow processing to generate a representation 307 of the 3D synthetic object rendered to represent the 2D real object 205. As described herein, optical flow processing can involve analyzing the apparent motion of objects or points in an image as they move between frames in a video sequence, and learning various patterns of pixel displacements between consecutive frames to identify and understand different motion patterns in videos or streaming images.

The moving sequence of 2D real images 205 and 3D synthetic images 207*a* convey additional information about the target object (e.g. moving turbine blade). For example, the representation 305 and 307 of the object (edge information, boundary view, pose, etc.) changes during the sequence flow of the input 2D real images 205 and 3D synthetic images 207*a*. In the example of a moving turbine blade, for example, the blade will have one have one representation when it enters the FOV of the borescope, but may undergo several changes in representation as it exits the FOV. The additional representation information 305 and 307 between the input 2D real images 205 and 3D synthetic images 207*a*, respectively, can improve learning a common representation space between the 2D real images 205 and the 3D synthetic images 207*a*, and therefore can be further utilized to further force the data points of the positive synthetic image point cloud and the real image point cloud closer to one another so as to further improve and refine the estimation and prediction accuracy of the viewpoint estimation model 310.

Figure 7:
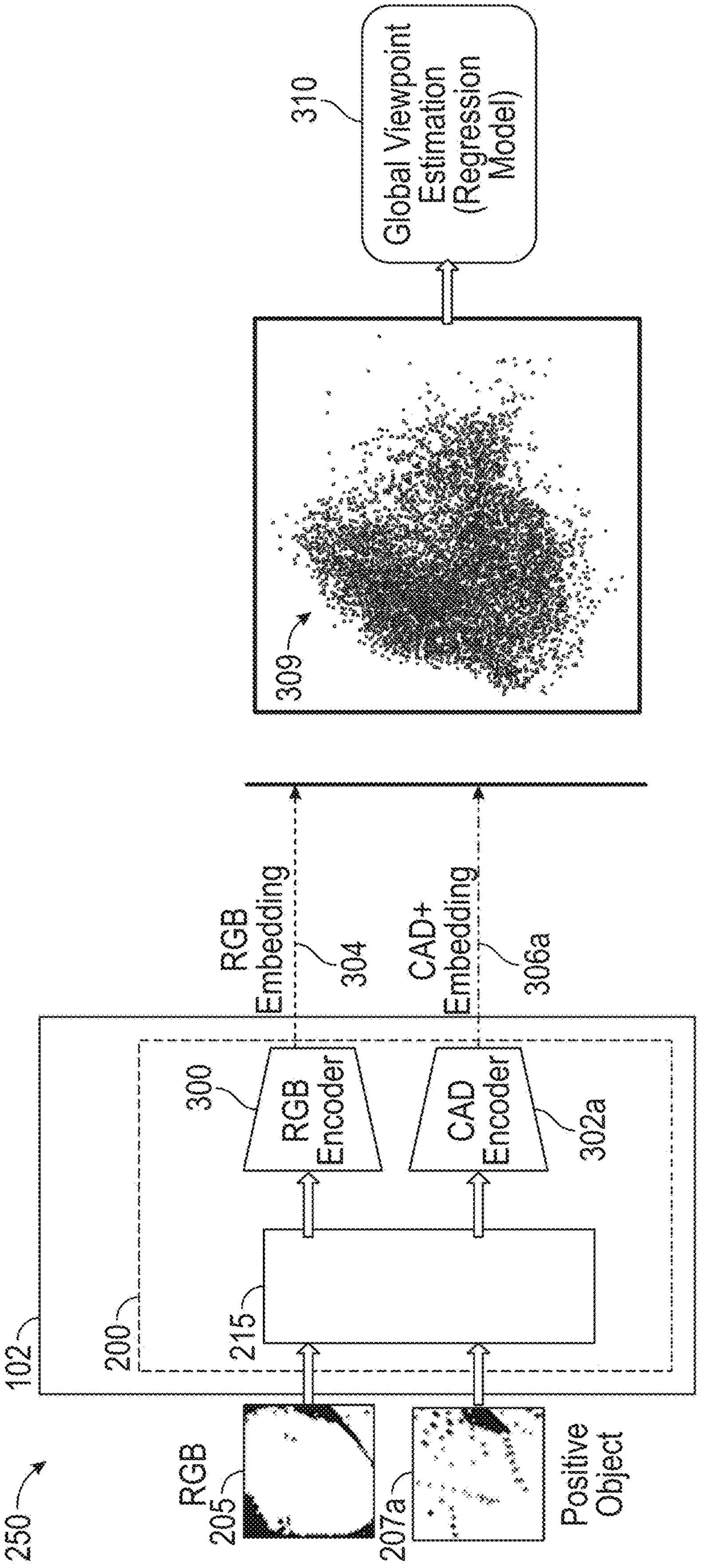
FIG. 7 depicts another domain gap reduction operation according to a non-limiting embodiment of the present disclosure.

Referring to FIG. 7, another additional processing operation that can reduce the domain gap (e.g., "error") between the real 2D images 205 and the positive synthetic 3D images 207*a* according to a non-limiting embodiment of the present disclosure. The example processing operation illustrated in FIG. 7 involves performing a Fourier Domain Analysis (FDA) operation on the real 2D images 205 and the positive synthetic 3D images 207*a*. For example, the domain gap reduction unit 215 can receive the real 2D images 205 and the positive synthetic 3D images 207*a*, and perform the FDA operation which swaps the phase magnitudes of the real 2D images 205 with the phase magnitudes of the positive synthetic 3D images 207*a*. In this manner, the positive 3D synthetic images 207*a* are processed to appear more similar to the 2D real images. The real image encoder 300 and the positive synthetic image encoder 302*a* can then operate on the FDA processed images to further force them closer together to further reduce the domain gap (e.g., the error between the real 2D images 205 and the positive synthetic 3D images 207*a*).

With reference now to FIGS. 8 through 12, methods involving "virtual modality matching" to predict an intermediate representation of a target object from a video image are described according to various non-limiting embodiments of the present disclosure. The term 'virtual" refers to estimating or predicting the depth of a target object appearing in a real 2D image rather than using a physical depth sensor (e.g., coupled to a borescope) to determine the depth of the target object.

Figure 8:
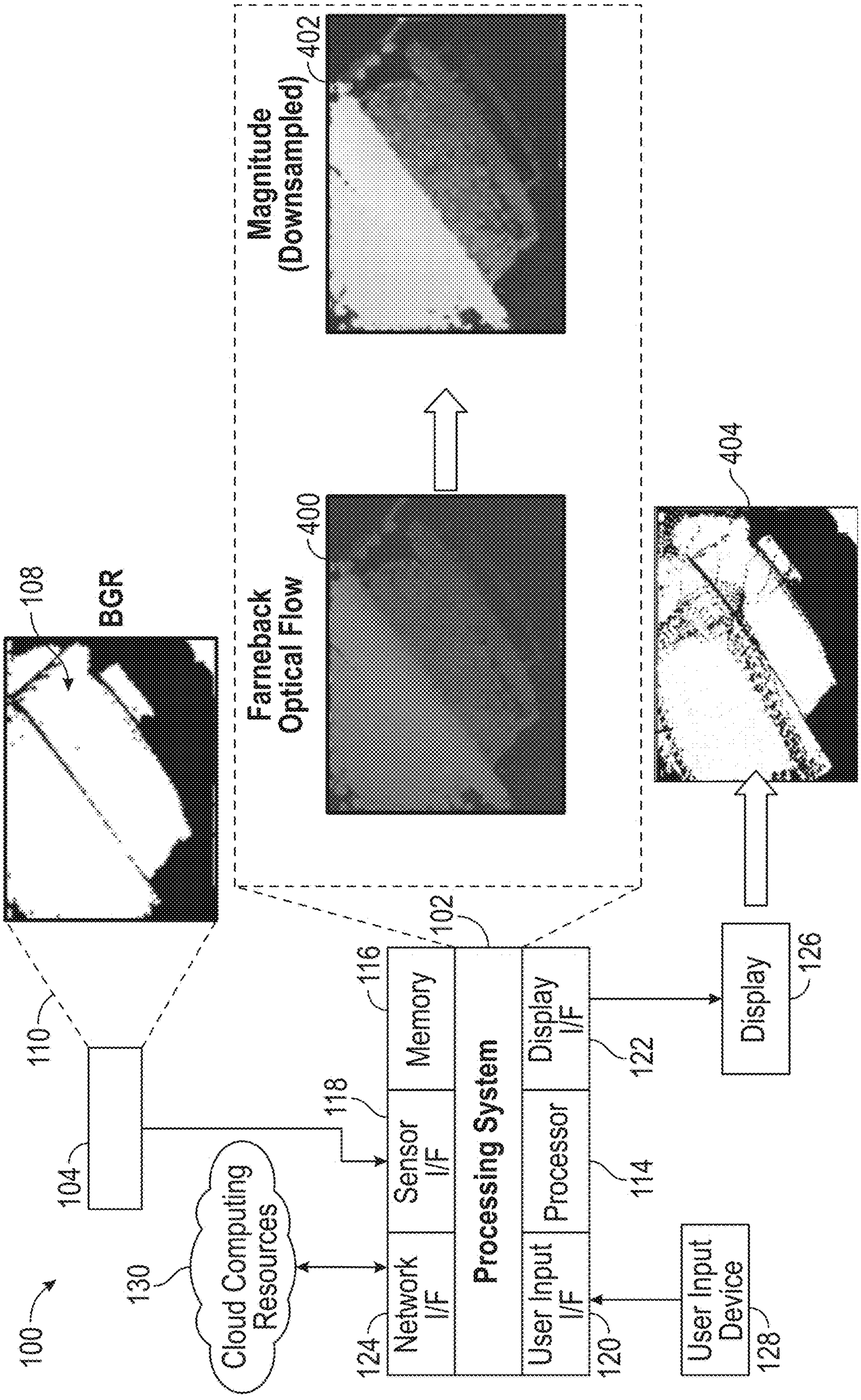
FIG. 8 depicts a method involving virtual modality matching to predict an intermediate representation of a target object from a real 2D image according to non-limiting embodiment of the present disclosure.

Referring to FIG. 8, an image sensor 104 (e.g., a borescope) captures a real 2D video of a moving object 108 (e.g., a turbine blade 108). The processing system 102 (e.g., included in imaging system 100 of FIG. 2) receives the real 2D video of a target object 108, performs image processing to determine depth information of the target object 108.

In one or more non-limiting embodiments, the image processing includes performing a Farneback optical flow analysis on the real 2D video to generate optical flow imagery 400, and then performing stereo imagery to down sampling the optical flow and generate a 3D stereo image 402. Regions of the object(s) closer to the image sensor 104 have a higher reflective energy intensity compared to regions further away from the image sensor 104. Accordingly, the processing system 122 can determine depth information based on the stereo images 402, and select synthetic 3D images (e.g., rendered CAD images) from memory 116 that have an estimated pose of the object(s) captured by the imaging sensor (e.g., borescope) 104.

Figure 9:
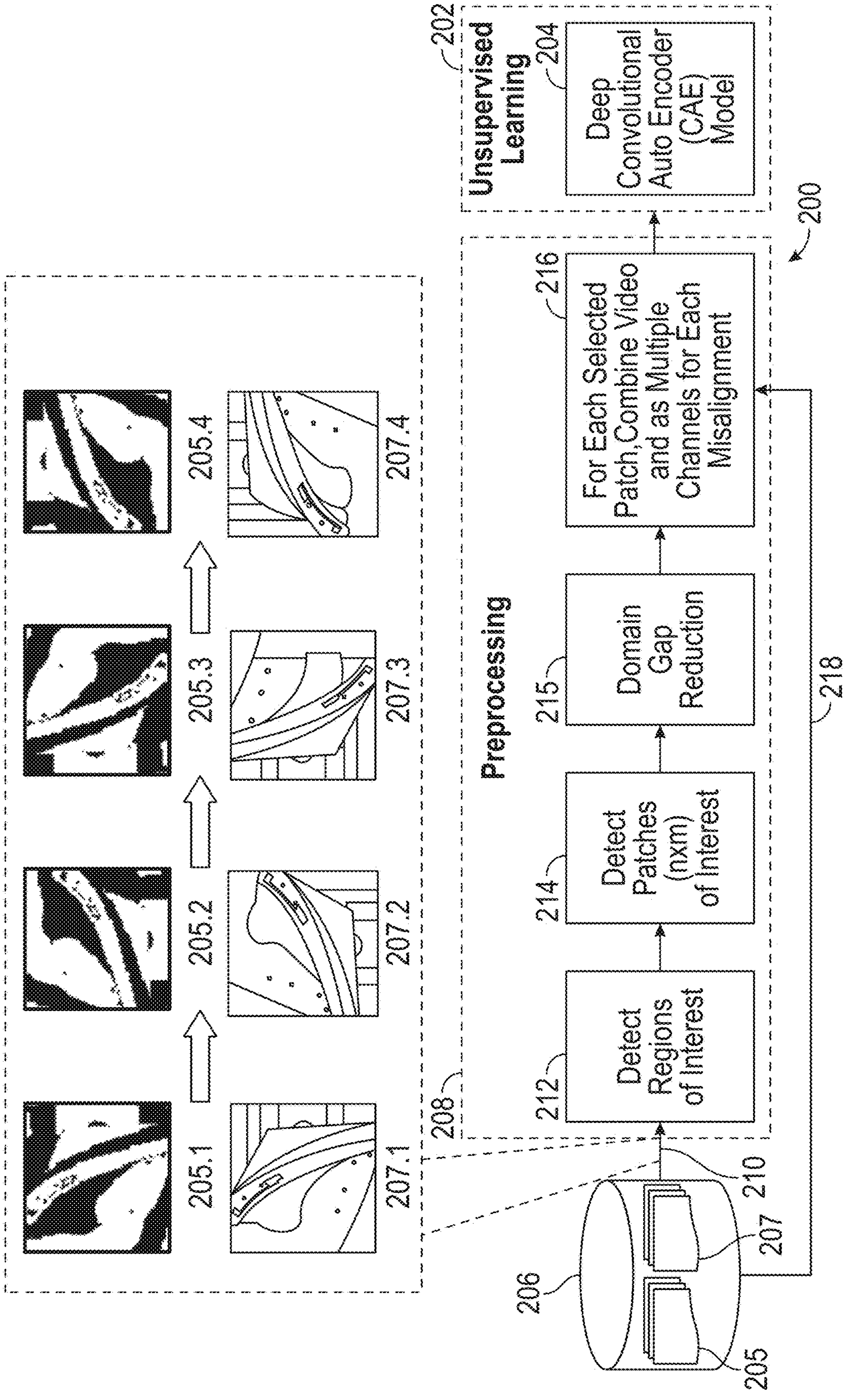
FIGS. 9 and 10 depict another method involving virtual modality matching to predict an intermediate representation of a target object from a real 2D image according to non-limiting embodiment of the present disclosure.
Figure 10:
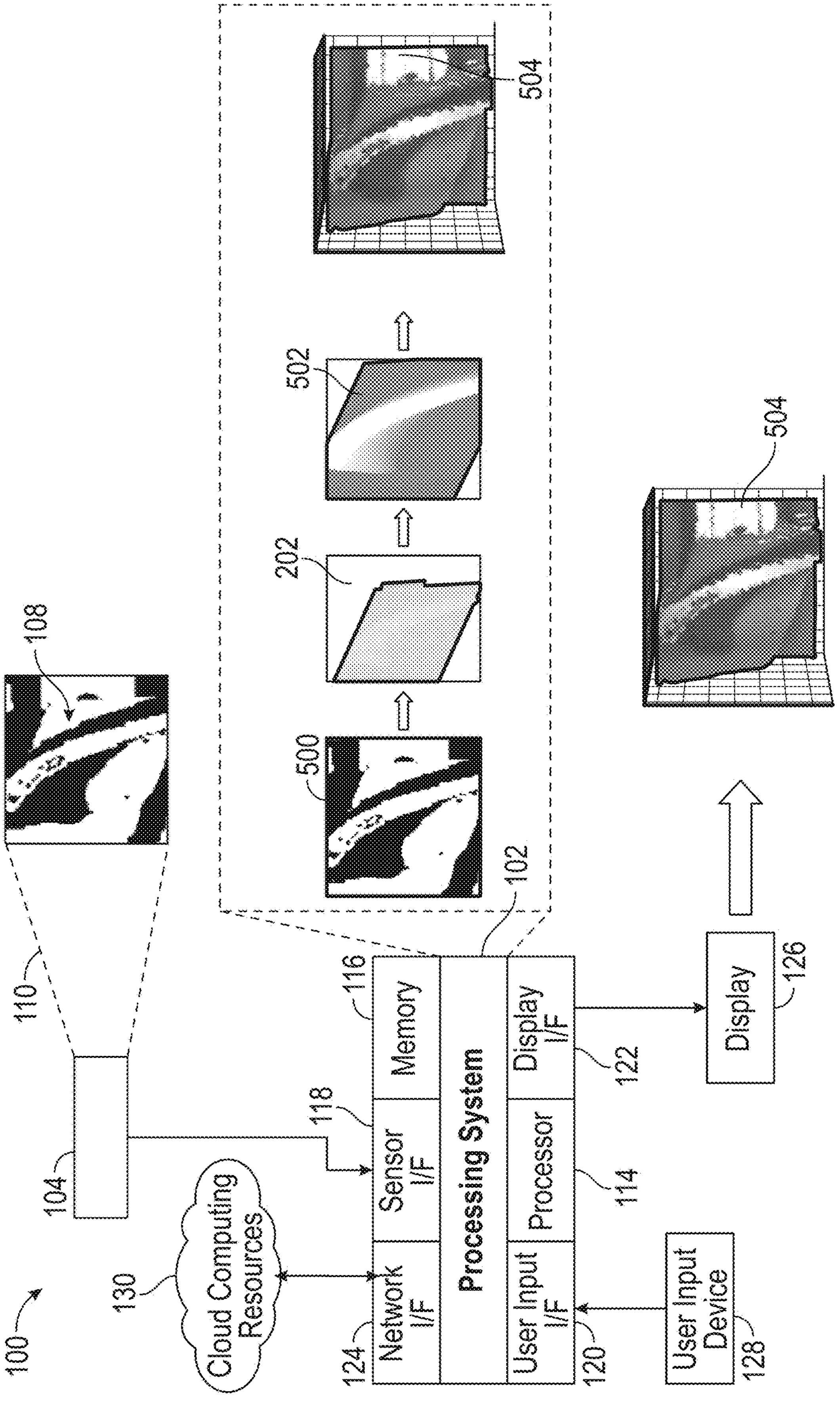

Turning to FIGS. 9 and 10, a "virtual modality matching" method for predicting an intermediate representation of a target object from a video image is depicted according to another non-limiting embodiment of the present disclosure. The initial phase of the method begins by training a neural network depth estimation model 204 using the training system 200 described herein. The training phase involves mounting a target object (e.g., a turbine blade) to a stand or moveable object (e.g., robotic arm), which facilitates positional and/or rotational (orientation or pose) adjustment of the target object. The target object can then be placed in different poses and real 2D images 205.1-205.4 of the object in the different poses can be captured to establish a known truth pose and known depth. Different synthesized 3D images 207.1-207.4 (e.g., rendered CAD images) can then be generated, which match or substantially match the pose of each of the real 2D images. Although only four images of the real 2D images 205.1-205.4 and the synthesized 3D images 207.1-207.4, it should be appreciated that several more images can be generated without departing from the scope of the invention. The real 2D images 205.1-205.4 and the synthesized 3D images 207.1-207.4 are then input into the training system 200 to train the neural network and generated a trained depth estimation model 204 as described herein. Details of the training process described above will not be repeated for the sake of brevity.

Referring to FIG. 10, the trained depth estimation model 204 is implemented in the imaging system 100 and used to estimate a depth of an object 108 captured by the image sensor 104 (e.g., borescope). The processing system then uses the estimated depth to render a synthesized 3D image 504 representing the object 108 captured by the image sensor 104. For example, the real 2D image 500 of the target object 108 is delivered from the image sensor 104 to the processing system 102. The processing system 102 inputs the real 2D image 500 to the trained depth estimation model 204, which in turn estimates the depth of the target object 108. Based on the estimated depth, the processing system 102 automatically renders (e.g., using CAD software executed by the processor 114) a synthesized 3D image 504 representing the object 108 captured by the image sensor 104 having a matching, or substantially matching, pose and depth as the target object 108 captured in the real 2D image 500.

Figure 11:
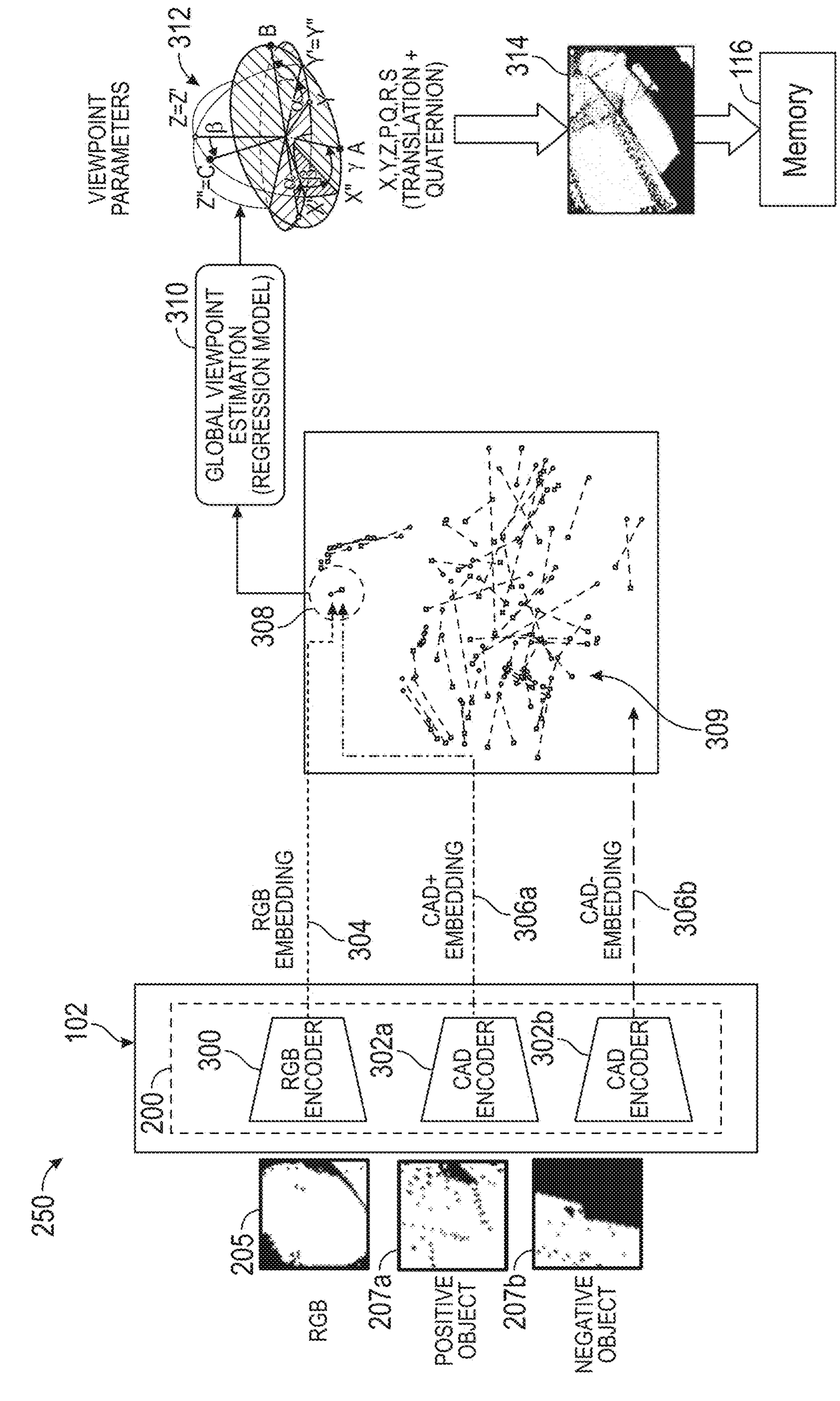
FIGS. 11 and 12 depict another method involving virtual modality matching to predict an intermediate representation of a target object from a real 2D image according to non-limiting embodiment of the present disclosure.
Figure 12:
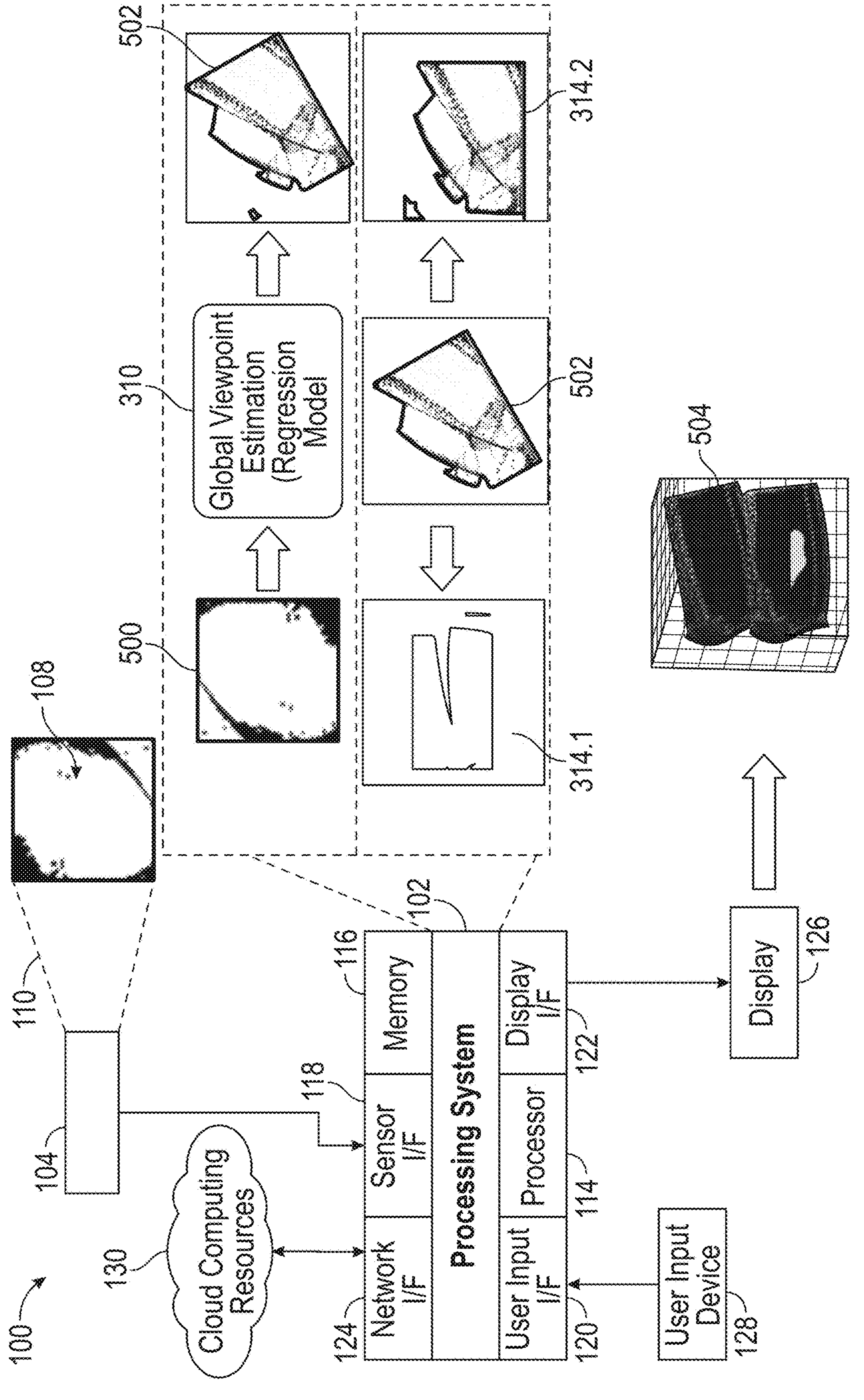

Turning now to FIGS. 11 and 12, a "virtual modality matching" method for predicting an intermediate representation of a target object from a 2D test image is depicted according to another non-limiting embodiment of the present disclosure. The initial phase of the method begins by training a neural network depth estimation model 310 using the training system 200 shown in FIG. 2 and the training techniques shown in FIG. 4, for example. Details of the training process described above will not be repeated for the sake of brevity. Once a training frame 314 is generated for use in training the neural network depth estimation model 310, the generated training frame 314 is stored in memory 116 of the imaging system 100 (shown in FIG. 1).

Turning to FIG. 12, the imaging system 100 is illustrated implementing the trained neural network depth estimation model 310. For any given real 2D image 500 generated by the image sensor 104 (e.g., borescope 104), the imaging system 100 can predict a preliminary synthetic rendering 502 (e.g., CAD image 502) of the target object 108 appearing in the real 2D image 500, compare the preliminary synthetic rendering 502 to the stored training frames 314.1, 314.2, 314.*n* (e.g., the positive 3D training images 207*a*) the stored in memory 116, and determine an estimated pose of the target object 108 based on the stored training frame (e.g., frame 314.2) having a pose that most closely matches the pose of the preliminary synthetic rendering 502. In one or more non-limiting embodiments, the imaging system 100 can use stored positive 3D images 207*a* having a domain gap that is less than an error threshold for the comparison. Using the estimated pose from the most closely-matched training frame (e.g., 314.2), the imaging system 100 renders a final synthesized 3D image 504, which can be displayed via display 126.

It should be appreciated that, although the invention is described hereinabove with regards to the inspection of only one type of object, it is contemplated that in other embodiments the invention may be used for various types of object inspection. The invention may be used for application specific tasks involving complex parts, scenes, etc. especially in smart factories.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Additionally, the invention may be embodied in the form of a computer or controller implemented processes. The invention may also be embodied in the form of computer program code containing instructions embodied in tangible media, such as floppy diskettes, CD-ROMs, hard drives, and/or any other computer-readable medium, wherein when the computer program code is loaded into and executed by a computer or controller, the computer or controller becomes an apparatus for practicing the invention. The invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire When implemented on a general-purpose microprocessor the computer program code segments may configure the microprocessor to create specific logic circuits.

Additionally, the processor may be part of a computing system that is configured to or adaptable to implement machine learning models which may include artificial neural networks, such as deep neural networks, convolutional neural networks, recurrent neural networks, vision transformers, encoders, decoders, or any other type of machine learning model. The machine learning models can be trained in a supervised, unsupervised, or hybrid manner.

While the present disclosure has been described with reference to an exemplary embodiment or embodiments, it will be understood by those skilled in the art that various changes may be made and equivalents may be substituted for elements thereof without departing from the scope of the present disclosure. Moreover, the embodiments or parts of the embodiments may be combined in whole or in part without departing from the scope of the invention. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this disclosure, but that the present disclosure will include all embodiments falling within the scope of the claims.

What is claimed is:

1. An object pose prediction system comprising:

a training system configured to:

repeatedly receive a plurality of training image sets, each training image set comprising a two-dimensional (2D) training image including a target object having a captured pose and a known depth corresponding to the captured poses, a positive three-dimensional (3D) training image representing the target object and having a rendered pose that is the same as the captured pose, and a negative 3D training image representing the 3D object and having a rendered pose that is different from the captured pose, wherein the target object included in each training image set has a different captured pose; and to train a machine learning model to learn a plurality of different poses associated with the target object in response to repeatedly receiving the plurality of training image sets; and to generate a depth map that maps the depth of the training object with the respective pose, the depth map used by the training system to train a machine learning model;

an imaging system configured to receive from an image sensor a 2D test image of a test object existing in real space and having a pose and depth, process the 2D test image using the trained machine learning model to predict a pose of the test object, and output a 3D test image including a rendering of the 2D test image having the predicted pose, wherein the imaging system is configured to generate an intermediate digital representation of the test object having a predicted pose and predicted depth based on the 2D test image, and to generate a 3D digital image of the test object having the predicted pose and the predicted depth.

2. The object pose prediction system of claim 1, wherein the 2D test image is generated by an image sensor that captures the test object in real-time, and the 3D test image is a computer-generated digital representation of the test object.

3. The object pose prediction system of claim 2, wherein the 2D training image is generated by an image sensor that captures the test object, and both of the positive 3D training image and the negative 3D training image are computer-generated digital representations of the training object.

4. The object pose prediction system of claim 3, wherein the training system trains the machine learning model using the 2D training image, the positive 3D training image, and the negative 3D training image defines a domain gap having a first error value associated with the machine learning model.

5. The object pose prediction system of claim 4, wherein the training system performs optical flow processing on the 2D training image and the positive 3D training image included in each training image set to adjust the domain gap from the first error value to a second error value less than the first error value.

6. The object pose prediction system of claim 4, wherein the training system performs a Fourier domain adaptation (FDA) operation on the 2D training image and the positive 3D training image included in each training image set to adjust the domain gap from the first value to a second value less than the first value.

7. The object pose prediction system of claim 1, wherein the imaging system includes a borescope configured to capture the 2D test image of the test object.

8. An object pose prediction system comprising:

a training system configured to repeatedly receive a plurality of training images of a training object having known depths corresponding to respective poses, to generate a depth map that maps the depth of the training object with the respective pose, and to train a machine learning model using the depth map;

an image sensor configured to generate at least one 2D test image of the test object existing in real space and having a pose and depth;

a processing system configured to generate an intermediate digital representation of the test object having a predicted pose and predicted depth based on the 2D test image, and to generate a 3D digital image of the test object having the predicted pose and the predicted depth.

9. The object pose prediction system comprising of claim 8, wherein the at least one 2D test image includes a video stream containing movement of the test object, and wherein the processing system performs optical flow processing on the video stream to determine the predicted pose and the predicted depth.

10. The object pose prediction system comprising of claim 8, wherein the image processing system generates the intermediate digital representation of the test object having a predicted pose based on the pose captured in the 2D test image and a predicted depth based on the trained machine learning model.

11. The object pose prediction system comprising of claim 10, wherein the image processing system generates the 3D digital image of the test object having the predicted pose and the predicted depth based on the intermediate digital representation of the test object.

12. The object pose prediction system of claim 8, further comprising:

a training system configured to:

repeatedly receive a plurality of training image sets, each training image set comprising a two-dimensional (2D) training image including a target object having a captured pose, a positive three-dimensional (3D) training image representing the target object and having a rendered pose that is the same as the captured pose, and a negative 3D training image representing the 3D object and having a rendered pose that is different from the captured pose, wherein the target object included in each training image set has a different captured pose; and to train a machine learning model to learn a plurality of different poses associated with the target object in response to repeatedly receiving the plurality of training image sets, wherein, the imaging system compares the intermediate digital representation of the test object having the predicted pose and the predicted depth to the positive 3D training images having rendered poses and rendered depths, determines a matching positive 3D training image having a rendered pose and rendered depth that mostly closely resembles the predicted pose and the predicted depth, and generates the 3D digital image of the test object having the predicted pose and the predicted depth based on the matching positive 3D training image.

13. The object pose prediction system of claim 8, wherein the image sensor is a borescope.

14. A method of predicting depth of a two-dimensional (2D) image, the method comprising:

repeatedly inputting a plurality of training image sets to a computer processor, each training image set comprising a two-dimensional (2D) training image including a target object having a captured pose and a known depth corresponding to the captured poses, a positive three-dimensional (3D) training image representing the target object and having a rendered pose that is the same as the captured pose, and a negative 3D training image representing the 3D object and having a rendered pose that is different from the captured pose, wherein the target object included in each training image set has a different captured pose; and training a machine learning model included in the computer processor to learn a plurality of different poses associated with the target object in response to repeatedly receiving the plurality of training image sets;

generating a depth map that maps the depth of the training object with the respective pose, the depth map used by the training system to train a machine learning model;

inputting a 2D test image of a test object existing in real space and having a pose and depth to the computer processor;

processing the 2D test image using the trained machine learning model to predict a pose of the test object, the processing including generating an intermediate digital representation of the test object having a predicted pose and predicted depth based on the 2D test image, and to generate a 3D digital image of the test object having the predicted pose and the predicted depth; and outputting a 3D test image including a rendering of the 2D test image having the predicted pose.

15. The method of claim 14, further comprising:

generating the 2D test image using an image capture the test object in real-time; and generating the 3D test images as digital representation of the test object.

16. The method of claim 15, further comprising:

generating the 2D training image using an image sensor that captures the test object; and generating both of the positive 3D training image and the negative 3D training as computer-generated digital representations of the training object.

17. The method of claim 16, further comprising training the machine learning model using the 2D training image, the positive 3D training image, and the negative 3D training image to define a domain gap having a first error value associated with the machine learning model.

18. The method of claim 17, further comprising performing an optical flow processing on the 2D training image and the positive 3D training image included in each training image set to adjust the domain gap from the first error value to a second error value less than the first error value.

19. The method of claim 17, further comprising performing a Fourier domain adaptation (FDA) operation on the 2D training image and the positive 3D training image included in each training image set to adjust the domain gap from the first value to a second value less than the first value.

* * * * *